US012709990B2

(12) United States Patent
Hamada et al.

(10) Patent No.: US 12,709,990 B2
(45) Date of Patent: Aug. 18, 2026

(54) MONITORING AND CONTROL DEVICE FOR ROTATING MACHINE, ROTATING MACHINE EQUIPMENT, MONITORING AND CONTROL METHOD FOR ROTATING MACHINE, AND MONITORING AND CONTROL PROGRAM FOR ROTATING MACHINE

(71) Applicant: MITSUBISHI HEAVY INDUSTRIES, LTD., Tokyo (JP)

(72) Inventors: Katsuhisa Hamada, Tokyo (JP); Makoto Kondo, Tokyo (JP); Takumi Matsumura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/701,754

(22) PCT Filed: Oct. 26, 2022

(86) PCT No.: PCT/JP2022/039840
§ 371 (c)(1),
(2) Date: Apr. 16, 2024

(87) PCT Pub. No.: WO2023/090089
PCT Pub. Date: May 25, 2023

(65) Prior Publication Data

US 2024/0418103 A1 Dec. 19, 2024

(30) Foreign Application Priority Data

Nov. 22, 2021 (JP) ................................ 2021-189121

(51) Int. Cl.
*F01D 21/00* (2006.01)
*F01D 21/12* (2006.01)
(Continued)

(52) U.S. Cl.
CPC .......... *F01D 21/003* (2013.01); *F01D 21/12* (2013.01); *F01D 25/10* (2013.01); *F01D 25/12* (2013.01);
(Continued)

(58) Field of Classification Search
CPC ........ F01D 21/003; F01D 21/04; F01D 21/12; F01D 25/10; F01D 25/12; F01D 25/24; F01D 25/26; F01D 25/265; F01D 25/28
See application file for complete search history.

(56) References Cited

U.S. PATENT DOCUMENTS

2008/0019821 A1* 1/2008 Narita .................... F01D 11/02 60/660
2008/0240902 A1* 10/2008 Cooper ................. G01K 13/04 374/E13.008
(Continued)

FOREIGN PATENT DOCUMENTS

JP H06-026364 A 2/1994
JP H09-004413 A 1/1997
(Continued)

OTHER PUBLICATIONS

International Search Report dated Jun. 6, 2024, issued in counterpart application No. PCT/JP2022/039840. (10 pages).
(Continued)

*Primary Examiner* — Courtney D Heinle
*Assistant Examiner* — Cameron A Corday
(74) *Attorney, Agent, or Firm* — WHDA, LLP

(57) ABSTRACT

A monitoring and control device for monitoring or controlling the clearance of a rotating machine including a vehicle cabin containing rotating and stationary parts comprises: an acquisition unit configured to acquire a plurality of temperatures at a plurality of locations in the vehicle cabin; and an index calculation unit configured to calculate an index
(Continued)

indicating the vertical displacement of the vehicle cabin on the basis of the plurality of temperatures.

13 Claims, 4 Drawing Sheets

(51) Int. Cl.

| | |
|---|---|
| ***F01D 25/10*** | (2006.01) |
| ***F01D 25/12*** | (2006.01) |
| ***F01D 25/26*** | (2006.01) |
| ***G01M 99/00*** | (2011.01) |

(52) U.S. Cl.

CPC ......... *F01D 25/265* (2013.01); *G01M 99/002* (2013.01); *F05D 2220/31* (2013.01); *F05D 2270/303* (2013.01)

(56) References Cited

U.S. PATENT DOCUMENTS

| | | | | |
|---|---|---|---|---|
| 2015/0078887 | A1* | 3/2015 | Ueda | F01D 25/162 415/116 |
| 2015/0345324 | A1* | 12/2015 | Spiegelberg | G01M 15/02 415/118 |
| 2017/0002683 | A1* | 1/2017 | Geveci | F01D 19/02 |
| 2018/0307205 | A1 | 10/2018 | Yashirodai et al. | |
| 2020/0056500 | A1* | 2/2020 | Uechi | F01D 25/243 |
| 2020/0063596 | A1* | 2/2020 | Sakamoto | F16M 1/04 |
| 2022/0235674 | A1* | 7/2022 | Kondo | F01D 25/16 |
| 2024/0026800 | A1 | 1/2024 | Kondo et al. | |

FOREIGN PATENT DOCUMENTS

| | | | |
|---|---|---|---|
| JP | 2000-356140 | A | 12/2000 |
| JP | 2010-270646 | A | 12/2010 |
| JP | 2013-174134 | A | 9/2013 |
| JP | 2014-040795 | A | 3/2014 |
| JP | 2015-098787 | A | 5/2015 |
| JP | 2018-066362 | A | 4/2018 |
| JP | 2018-168809 | A | 11/2018 |
| JP | 2018-178960 | A | 11/2018 |
| JP | 2021-042713 | A | 3/2021 |
| TW | 202235745 | A | 9/2022 |

OTHER PUBLICATIONS

Notification of Transmittal of Translation of the International Preliminary Report on Patentabililty (Form PCT/IB/338) issued in counterpart International Application No. PCT/JP2022/039840 mailed Jun. 6, 2024 with Forms PCT/IB/373, PCT/IB/326, and PCT/ISA/237 translation dated Dec. 6, 2022. (12 pages).

Office Action dated May 6, 2026, issued in counterpart IN Application No. 202417036823 (11 pages).

Tiwari, R., Condition Monitoring of Rotating Machinery: A Recent Trend, Department of Mechanical Engineering, Indian Institute of Technology Guwahati, 2021 (7 pages); Cited in IN Office Action dated May 6, 2026.

* cited by examiner

AXIAL DIRECTION
UP-DOWN DIRECTION
100
1
2
O
6
8
10
62(60)
64(60)
32a
32b
3
3a
3b
4
4a
4b
28
29
$L_A$
$L_B$
$L_C$
$L_D$
$L_E$
$L_F$
30A-1
30B-1
30B-2
30B-3
30C-1
30C-2
30C-3
30D-1
30D-2
30E-1
30E-2
30E-3
30F-1
30F-3

AXIAL DIRECTION
UP-DOWN DIRECTION
O
10
34b
26
100
1
22
2
18
29
3a(3)
4a(4)
14
19
28
16
20
12
22
36
26
34a
10

MONITORING AND CONTROL DEVICE FOR ROTATING MACHINE, ROTATING MACHINE EQUIPMENT, MONITORING AND CONTROL METHOD FOR ROTATING MACHINE, AND MONITORING AND CONTROL PROGRAM FOR ROTATING MACHINE

TECHNICAL FIELD

The present disclosure relates to a monitoring and control device for a rotating machine, rotating machine equipment, a monitoring and control method for a rotating machine, and a monitoring and control program for a rotating machine.

The present application claims priority based on Japanese Patent Application No. 2021-189121 filed in Japan on Nov. 22, 2021, the contents of which are incorporated herein by reference.

BACKGROUND ART

In a rotating machine including a vehicle cabin (casing) that accommodates a rotating part and a stationary part, the vehicle cabin may move up and down due to a temperature difference at a plurality of positions of the vehicle cabin, and a clearance between the rotating part and the stationary part may change. It is important to maintain the clearance within an appropriate range in order to avoid contact between the rotating part and the stationary part.

For example, PTL 1 describes that in order to appropriately maintain a gap between a rotating body and a stationary part when thermal deformation occurs in a casing of a steam turbine, the deformation of the casing is estimated from a measurement value by means of a temperature sensor provided in each of an upper-half portion and a lower-half portion of the casing, and a position of the casing in a height direction is adjusted based on the estimation result.

PTL 2 describes that in order to prevent deformation of a casing at a time of stopping a gas turbine and to prevent contact between a rotor and the casing, a temperature of a top portion and a temperature of a bottom portion of the casing are measured, respectively, and when a difference between the temperatures reaches a threshold value, an upper-half portion of the casing is cooled.

CITATION LIST

Patent Literature

[PTL 1] Japanese Unexamined Patent Application Publication No. 2010-270646

[PTL 2] Japanese Unexamined Patent Application Publication No. H6-26364

SUMMARY OF INVENTION

Technical Problem

When an index indicating a displacement of a vehicle cabin in an up-down direction can be obtained by using an amount (temperature or the like) indicating a state of the vehicle cabin of a rotating machine, a clearance between a rotating part and a stationary part can be more appropriately monitored or controlled, and contact between the rotating part and the stationary part can be effectively suppressed.

In view of the above circumstances, at least one embodiment of the present invention has an object to provide a monitoring and control device for a rotating machine, rotating machine equipment, a monitoring and control method for a rotating machine, and a monitoring and control program for a rotating machine, which are capable of more appropriately monitoring or controlling a clearance between a rotating part and a stationary part.

Solution to Problem

A monitoring and control device for a rotating machine according to at least one embodiment of the present invention is a monitoring and control device for monitoring or controlling a clearance of a rotating machine including a vehicle cabin that accommodates a rotating part and a stationary part, the monitoring and control device including an acquisition unit configured to acquire a plurality of temperatures at a plurality of positions of the vehicle cabin, and an index calculation unit configured to calculate an index indicating a displacement of the vehicle cabin in an up-down direction based on the plurality of temperatures.

In addition, rotating machine equipment according to at least one embodiment of the present invention includes a rotating machine including a vehicle cabin that accommodates a rotating part and a stationary part, and the above-described monitoring and control device for monitoring or controlling a clearance of the rotating machine.

In addition, a monitoring and control method for a rotating machine according to at least one embodiment of the present invention is a monitoring and control method for monitoring or controlling a clearance of a rotating machine including a vehicle cabin that accommodates a rotating part and a stationary part, the monitoring and control method including a step of acquiring a plurality of temperatures at a plurality of positions of the vehicle cabin, and a step of calculating an index indicating a displacement of the vehicle cabin in an up-down direction based on the plurality of temperatures.

In addition, a monitoring and control program for a rotating machine according to at least one embodiment of the present invention is a monitoring and control program for monitoring or controlling a clearance of a rotating machine including a vehicle cabin that accommodates a rotating part and a stationary part, the monitoring and control program being configured to cause a computer to execute a procedure of acquiring a plurality of temperatures at a plurality of positions of the vehicle cabin, and a procedure of calculating an index indicating a displacement of the vehicle cabin in an up-down direction based on the plurality of temperatures.

Advantageous Effects of Invention

According to at least one embodiment of the present invention, there are provided a monitoring and control device for a rotating machine, rotating machine equipment, a monitoring and control method for a rotating machine, and a monitoring and control program for a rotating machine, which are capable of more appropriately monitoring or controlling a clearance between a rotating part and a stationary part.

DESCRIPTION OF EMBODIMENTS

Figure 1:
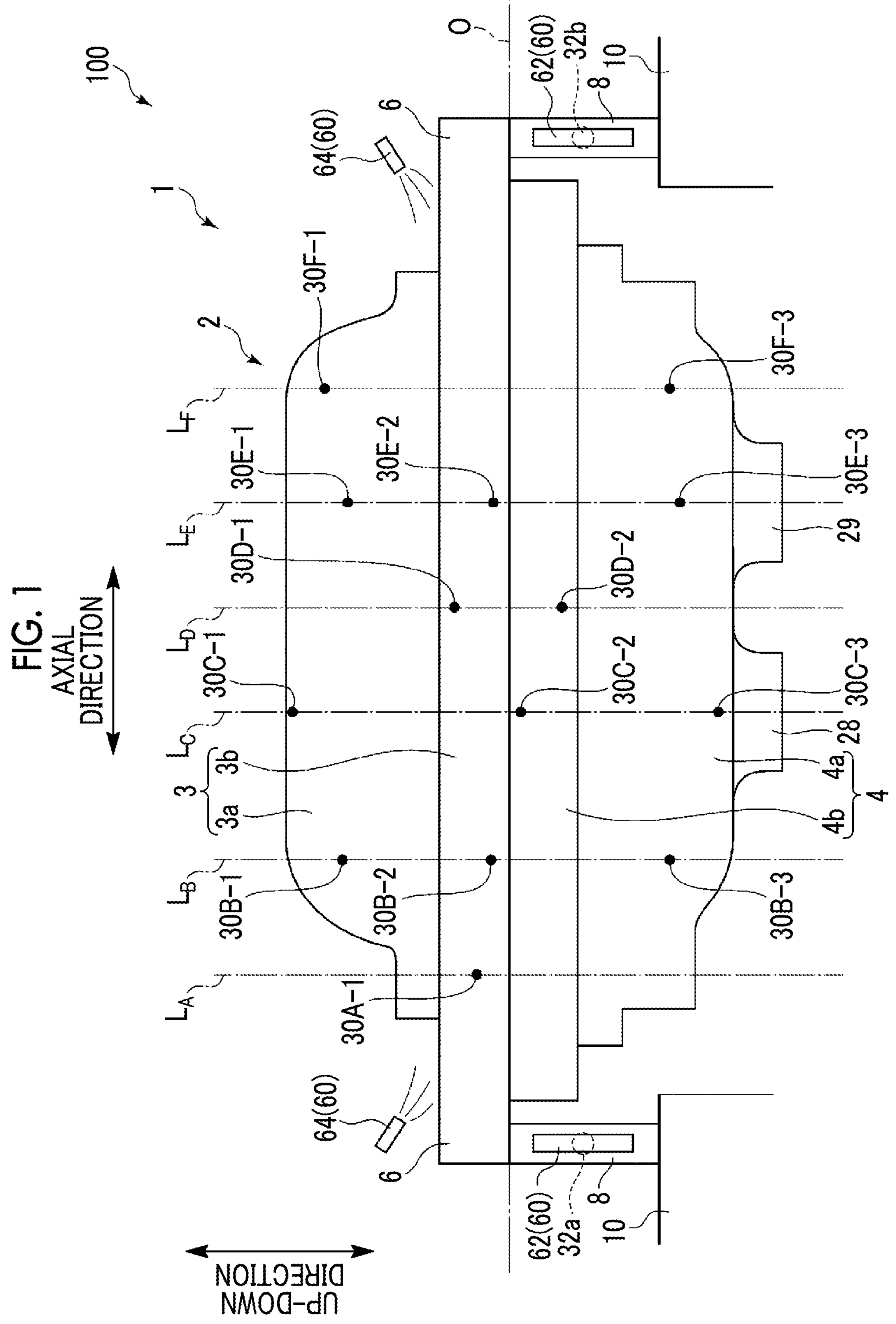
FIG. 1 is a schematic view of rotating machine equipment according to an embodiment, including a steam turbine (rotating machine).

Hereinafter, some embodiments of the present invention will be described with reference to the accompanying drawings. Dimensions, materials, shapes, relative arrangements, and the like of components described as embodiments or illustrated in the drawings are not intended to limit the scope of the present invention, but are merely explanatory examples.

(Configuration of Rotating Machine Equipment)

Figure 2:
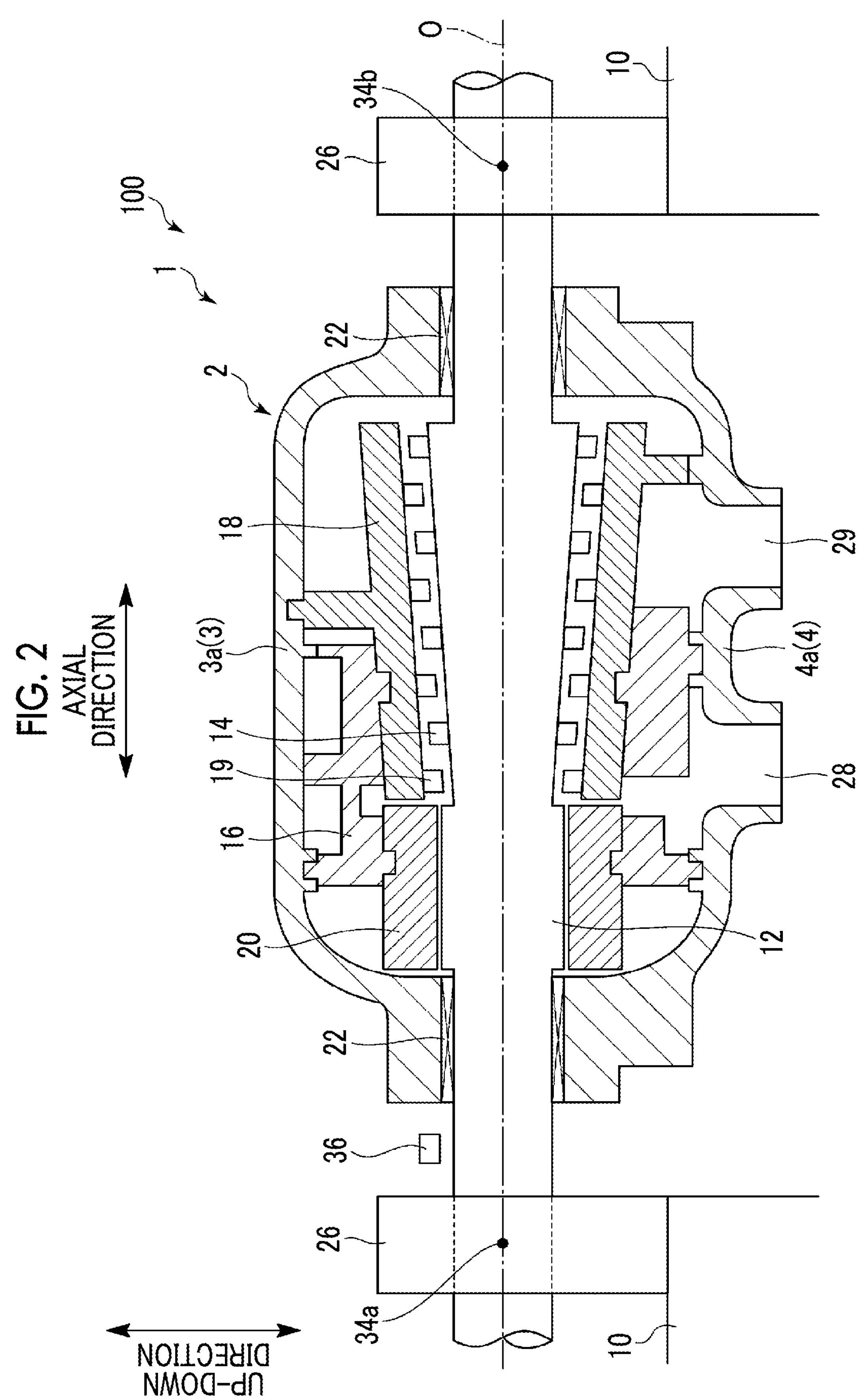
FIG. 2 is a schematic sectional view taken along an axial direction of the steam turbine shown in FIG. 1.
Figure 3:
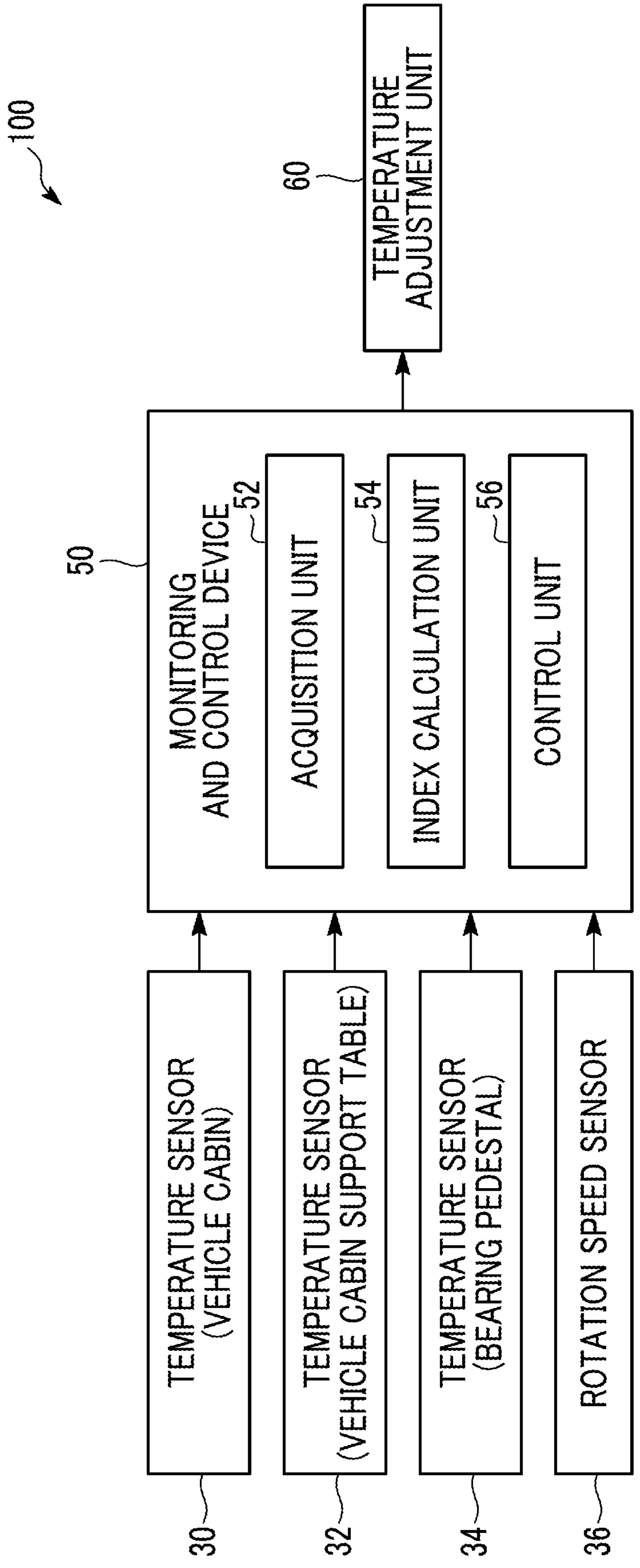
FIG. 3 is a schematic configuration view showing a monitoring and control device according to an embodiment.

FIG. 1 is a schematic view of rotating machine equipment according to an embodiment, and is a schematic view of the rotating machine equipment including a steam turbine as an example of a rotating machine. FIG. 2 is a schematic sectional view taken along an axial direction of the steam turbine shown in FIG. 1. FIG. 3 is a schematic configuration view showing a monitoring and control device according to an embodiment.

Rotating machine equipment 100 according to some embodiments includes a steam turbine (rotating machine) 1 (see FIGS. 1 and 2) and a monitoring and control device 50 (see FIG. 3) for monitoring or controlling a clearance between a rotating part and a stationary part of the steam turbine 1.

As shown in FIGS. 1 and 2, the steam turbine 1 includes a rotor 12 (not shown in FIG. 1) that is rotatable around a central axis O, and an outer vehicle cabin (vehicle cabin) 2 that accommodates the rotating part, including the rotor 12, and the stationary part.

The outer vehicle cabin 2 includes a vehicle cabin upper-half portion 3 and a vehicle cabin lower-half portion 4 that is positioned below the vehicle cabin upper-half portion 3 in an up-down direction (that is, a vertical direction). The vehicle cabin upper-half portion 3 includes an upper shell 3*a* and an upper flange 3*b*. The vehicle cabin lower-half portion 4 includes a lower shell 4*a* and a lower flange 4*b*. The upper flange 3*b* of the vehicle cabin upper-half portion 3 and the lower flange 4*b* of the vehicle cabin lower-half portion 4 are fastened by bolts (not shown).

The outer vehicle cabin 2 is supported by a vehicle cabin support table 8 fixed to a foundation 10. In the shown embodiment, the vehicle cabin upper-half portion 3 has a protrusion portion 6 (also referred to as a cat's paw) protruding in the axial direction (direction of the central axis O of the rotor), and the protrusion portion 6 is placed on the vehicle cabin support table 8. In this way, the outer vehicle cabin 2 is supported by the vehicle cabin support table 8 via the protrusion portion 6. In the outer vehicle cabin 2 shown in FIG. 1, the vehicle cabin upper-half portion 3 is provided with a pair of the protrusion portions 6 on both sides of the central axis O in a plan view at both end portions in the axial direction, that is, a total of four protrusion portions 6 are provided.

As shown in FIG. 2, the rotating part accommodated in the outer vehicle cabin 2 includes the rotor 12 and a plurality of rotor blades 14 provided in the rotor 12 to protrude from the rotor 12 in a radial direction. As shown in FIG. 2, the rotor 12 is provided to penetrate the outer vehicle cabin 2. In addition, the rotor 12 is rotatably supported by a bearing accommodated in a bearing pedestal 26 fixed to the foundation 10.

As shown in FIG. 2, the stationary part accommodated in the outer vehicle cabin 2 includes an inner vehicle cabin 16 supported by the outer vehicle cabin 2, a blade ring 18, a stator blade 19, and a dummy ring 20 supported by the inner vehicle cabin 16. The stator blades 19 are supported by the inner vehicle cabin 16 via the blade ring 18, and are provided to be positioned upstream of the rotor blades 14 of each stage in the axial direction.

The steam turbine 1 has steam inlet portions 28 and 29 for introducing steam into the steam turbine 1. In addition, seal portions 22 for suppressing leakage of a fluid through a gap between the outer vehicle cabin 2 and the rotor 12 are provided at both end portions of the outer vehicle cabin 2 in the axial direction.

A gap (clearance) is formed between the rotating part and the stationary part in the radial direction inside the steam turbine 1. The clearance is, for example, a clearance between a tip of the rotor blade 14 and the blade ring 18, a clearance between the rotor 12 and a tip of the stator blade 19, or a clearance between the rotor 12 and a seal fin (not shown) provided in the dummy ring 20.

In some embodiments, the rotating machine equipment 100 includes a temperature sensor for measuring temperatures at a plurality of positions in the vehicle cabin. In the exemplary embodiment shown in FIG. 1, the steam turbine 1 is provided with a plurality of temperature sensors 30A-1 to 30F-2 (hereinafter, also collectively referred to as temperature sensors 30) configured to measure temperatures at the plurality of positions in the outer vehicle cabin 2, respectively.

In some embodiments, a plurality of the temperature sensors 30 include at least one temperature sensor (for example, temperature sensors 30B-1, 30C-1, 30E-1, and 30F-1 in FIG. 1) for measuring a temperature of the upper shell 3*a*.

In some embodiments, the plurality of temperature sensors 30 include at least one temperature sensor (for example, temperature sensors 30B-3, 30C-3, 30E-3, and 30F-2 in FIG. 1) for measuring a temperature of the lower shell 4*a*.

In some embodiments, the plurality of temperature sensors 30 include at least one temperature sensor (for example, temperature sensors 30A-1, 30B-2, 30D-1, and 30E-2 in FIG. 1) for measuring a temperature of the upper flange 3*b*.

In some embodiments, the plurality of temperature sensors 30 include at least one temperature sensor (for example, temperature sensors 30C-2 and 30D-2 in FIG. 1) for measuring a temperature of the lower flange 4*b*.

Straight lines $L_A$ to $L_F$ in FIG. 1 are straight lines indicating positions in the axial direction, and indicate that the temperature sensors (for example, the temperature sensors 30B-1 to 30B-3 on a straight line $L_B$) positioned on the same straight line are positioned at the same position in the axial direction. An arrangement of the temperature sensors 30 shown in FIG. 1 is for description, and it is not necessary that the axial positions of some of the plurality of temperature sensors 30 are the same.

In some embodiments, the rotating machine equipment 100 may include a temperature sensor for measuring a temperature of the vehicle cabin support table 8. In the exemplary embodiment shown in FIG. 1, the steam turbine 1 is provided with temperature sensors 32*a* and 32*b* (hereinafter, also collectively referred to as temperature sensors 32) configured to measure the temperature of the vehicle cabin support table 8.

In some embodiments, the rotating machine equipment 100 may include a temperature sensor for measuring a temperature of the bearing pedestal 26. In the exemplary embodiment shown in FIG. 1, the steam turbine 1 is provided with temperature sensors 34*a* and 34*b* (hereinafter, also collectively referred to as temperature sensors 34) configured to measure the temperature of the bearing pedestal 26.

In some embodiments, the rotating machine equipment 100 may include a rotation speed sensor 36 (see FIG. 2) for measuring a rotation speed of the rotor 12.

Signals indicating the measurement values by means of the temperature sensors 30, 32, and 34 and the rotation speed sensor 36 are sent to a monitoring and control device 50 (to be described later).

In some embodiments, the rotating machine equipment 100 includes a temperature adjustment unit 60 for heating or cooling at least a part of the outer vehicle cabin 2 or the vehicle cabin support table 8. By heating or cooling at least a part of the outer vehicle cabin 2 or the vehicle cabin support table 8 by means of the temperature adjustment unit 60, a thermal elongation amount of the outer vehicle cabin 2 or the vehicle cabin support table 8 can be adjusted, and thus, a shape or a position of the outer vehicle cabin 2 can be adjusted. Therefore, the shape or the position of the outer vehicle cabin 2 can be appropriately adjusted by the temperature adjustment unit 60, so that an internal clearance of the steam turbine 1 can be maintained in an appropriate range.

In one embodiment, for example, as shown in FIG. 1, the temperature adjustment unit 60 includes a heating unit 62 for heating the vehicle cabin support table 8 that supports the outer vehicle cabin 2. By heating the vehicle cabin support table 8 with the heating unit 62, the position of the outer vehicle cabin 2 is changed such that the vehicle cabin support table 8 thermally elongates in the vertical direction and the outer vehicle cabin 2 is lifted.

The heating unit 62 may be a heater configured to generate heat by using electric energy. In the exemplary embodiment shown in FIG. 1, the heating unit 62 includes a panel-shaped heater provided on a surface of the vehicle cabin support table 8. In a case where both the temperature sensor 32 and the heating unit 62 are provided on the vehicle cabin support table 8, the temperature sensor 32 and the heating unit 62 may be provided to be separated from each other. For example, the temperature sensor 32 and the heating unit 62 may be respectively provided on surfaces of the vehicle cabin support table 8 facing different directions.

In one embodiment, for example, as shown in FIG. 1, the temperature adjustment unit 60 includes a cooling unit 64 for cooling the protrusion portion 6 of the outer vehicle cabin 2. The protrusion portion 6 is cooled by the cooling unit, so that the outer vehicle cabin 2 is deformed to be sunk.

The cooling unit 64 may be configured to supply a cooling fluid to the protrusion portion 6. In the exemplary embodiment shown in FIG. 1, the cooling unit 64 includes a nozzle configured to eject air as a cooling fluid toward the protrusion portion 6.

Alternatively, the temperature adjustment unit 60 may include a cooling cell that is provided in the upper shell 3*a* of the outer vehicle cabin 2 and that is configured to supply a cooling fluid. The upper shell 3*a* is cooled by the cooling cell, so that the outer vehicle cabin 2 is deformed to be sunk.

The monitoring and control device 50 is configured to receive and process signals from the temperature sensors 30, 32, and 34 and/or the rotation speed sensor 36. As shown in FIG. 3, the monitoring and control device 50 according to an embodiment includes an acquisition unit 52, an index calculation unit 54, and a control unit 56.

The acquisition unit 52 is configured to receive a signal indicating a measurement value by means of each sensor from the temperature sensors 30, 32, and 34 and/or the rotation speed sensor 36.

The index calculation unit 54 is configured to calculate an index indicating a displacement of the outer vehicle cabin 2 (vehicle cabin) in the up-down direction based on a plurality of temperatures acquired by the acquisition unit 52.

The control unit 56 is configured to adjust the shape or the position of the outer vehicle cabin 2 (vehicle cabin) based on the index calculated by the index calculation unit 54.

The monitoring and control device 50 includes a computer including a processor (CPU or the like), a storage device (a memory device; a RAM or the like), an auxiliary storage unit, an interface, and the like. The monitoring and control device 50 is configured to receive the signals from the temperature sensors 30, 32, and 34 and/or the rotation speed sensor 36 via the interface. The processor is configured to process the received signals. In addition, the processor is configured to process a program loaded into the storage device. In this manner, functions of the above-described functional units (the acquisition unit 52, the index calculation unit 54, and the control unit 56) are realized.

The processing content in the monitoring and control device 50 is implemented as a program to be executed by the processor. The programs may be stored in an auxiliary storage unit. When the programs are executed, these programs are loaded into the storage device. The processor reads the program from the storage device and executes a command included in the program.

In the monitoring and control device 50 having the above-described configuration, it is possible to calculate the index indicating the displacement of the outer vehicle cabin 2 in the up-down direction, based on the plurality of temperatures at the plurality of positions in the outer vehicle cabin 2 (vehicle cabin). Therefore, the clearance between the rotating part and the stationary part can be more appropriately monitored or controlled based on the index calculated in this way. In addition, a temperature of the outer vehicle cabin 2 can be acquired by a simple configuration in which the temperature sensor 30 is provided in the outer vehicle cabin 2. Therefore, in the above-described configuration, the index indicating the displacement of the outer vehicle cabin 2 in the up-down direction can be calculated with a simple configuration, and the clearance can be appropriately monitored or controlled based on the calculated index.

(Monitoring and Control Flow of Rotating Machine)

Next, a flow of a monitoring and control method for a rotating machine according to some embodiments will be described. Hereinafter, a case where the above-described steam turbine 1 is monitored and controlled using the above-described monitoring and control device 50 will be described. However, the rotating machine to be monitored and controlled is not limited to the above-described steam turbine 1, and some or all procedures to be described below may be manually performed.

Figure 4:
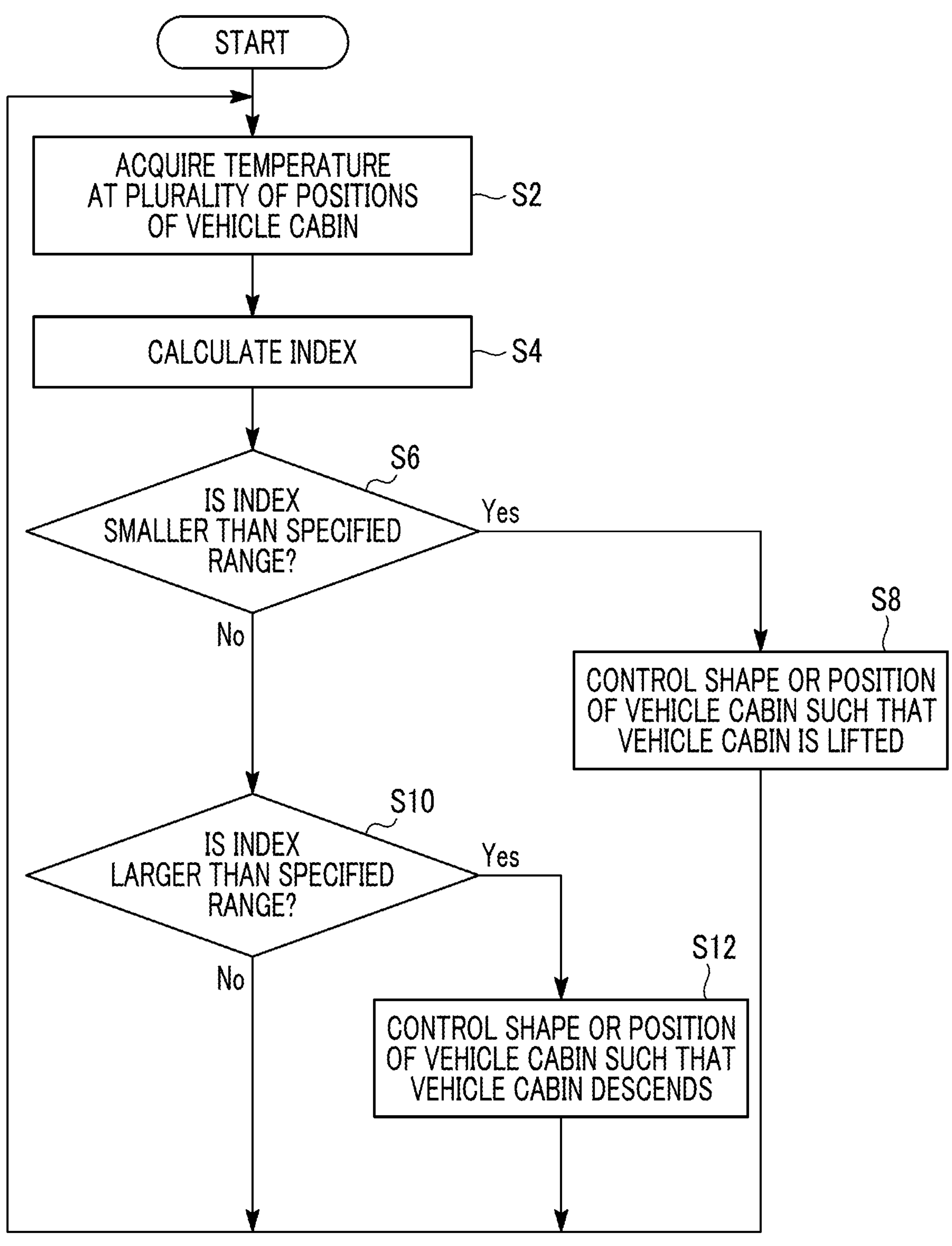
FIG. 4 is a flowchart showing a monitoring and control method for a rotating machine according to an embodiment.

FIG. 4 is a flowchart showing a monitoring and control method for a rotating machine according to an embodiment.

In one embodiment, first, the acquisition unit 52 acquires the plurality of temperatures at the plurality of positions in the outer vehicle cabin 2 (vehicle cabin) (S2). The acquisition unit 52 may acquire the plurality of temperatures by receiving a signal indicating measurement values by means of the plurality of temperature sensors 30.

In the following description, the temperature measurement value by means of the temperature sensor 30 described above is represented by T. For example, a temperature measurement value by means of the temperature sensor 30A-1 is represented by $T_{A1}$, and a measurement value by means of the temperature sensor 30F-2 is represented by $T_{F2}$. The same applies to other temperature sensors 30.

In step S2, the acquisition unit 52 may acquire the temperature of the vehicle cabin support table 8 (measurement value by means of the temperature sensor 32), the temperature of the bearing pedestal 26 (measurement value by means of the temperature sensor 34), and/or the rotation speed of the rotor 12 (measurement value by means of the rotation speed sensor 36) as needed (that is, in a case of being used for the index calculation in the subsequent step S4).

Next, the index calculation unit 54 calculates an index CCI (clearance control index) indicating the displacement of the outer vehicle cabin 2 in the up-down direction, based on the plurality of temperatures of the outer vehicle cabin 2 acquired in step S2 (S4). In step S4, in addition to the plurality of temperatures of the outer vehicle cabin 2, the index CCI may be acquired based on the temperature of the vehicle cabin support table 8, the temperature of the bearing pedestal 26, or the rotation speed of the rotor 12 acquired in step S2.

The index CCI indicating the displacement of the outer vehicle cabin 2 in the up-down direction can be expressed in a form of, for example, the following equation (A).

$$CCI = k_1 \times I_1 + k_2 \times I_2 + k_3 \times I_3 + k_4 \times I_4 + k_5 \times I_5 + k_6 \times I_6 + C_A \quad \text{(A)}$$

When the index CCI is greater than zero, it indicates that the outer vehicle cabin 2 is displaced upward from a reference position, and when the index CCI is smaller than zero, it indicates that the outer vehicle cabin 2 is displaced downward from the reference position.

In the above equation (A), $k_1$ to $k_6$ represent coefficients.

Here, a product ($k_n \times I_n$) of a coefficient $k_n$ and $I_n$ in the above equation (A) is referred to as an n-th term. $I_n$ indicates the temperature, a temperature difference, or the like of the outer vehicle cabin 2 as will be described below. That is, the index CCI can be expressed using a linear combination of the plurality of temperatures at the plurality of positions of the outer vehicle cabin 2.

$I_1$ included in the first term of the above equation (A) is a value representing a temperature difference between the upper shell 3*a* and the lower shell 4*a* of the outer vehicle cabin 2. If the upward displacement of the outer vehicle cabin 2 is set to be positive, the coefficient $k_1$ of the first term is a positive value. When the temperature of the upper shell 3*a* is higher than the temperature of the lower shell 4*a*, the outer vehicle cabin 2 is deformed such that a central portion of the outer vehicle cabin 2 in the axial direction is lifted, and the outer vehicle cabin 2 is displaced upward. The first term is a term representing such a displacement of the outer vehicle cabin 2.

It is desirable that a temperature measurement position of the upper shell 3*a* and a temperature measurement position of the lower shell 4*a*, which are used for the calculation of $I_1$, are close to each other in the axial direction. $I_1$ may be, for example, a difference ($T_{B1}-T_{B3}$) between $T_{B1}$ and $T_{B3}$, a difference ($T_{C1}-T_{C3}$) between $T_{C1}$ and $T_{C3}$, or a difference ($T_{F1}-T_{F2}$) between $T_{F1}$ and $T_{F2}$, or may be a linear combination of two or more of these (for example, $k_B \times (T_{B1}-T_{B2})+k_C \times (T_{C1}-T_{C3})+k_F \times (T_{F1}-T_{F2})$, where $k_B$, $k_C$, and $k_F$ are coefficients).

$I_2$ included in the second term of the above equation (A) is a value representing a temperature difference between a shell portion (upper shell 3*a* or lower shell 4*a*) and a flange portion (upper flange 3*b* or lower flange 4*b*) of the outer vehicle cabin 2. If the upward displacement of the outer vehicle cabin 2 is set to be positive, the coefficient $k_2$ of the second term is a positive value. When a temperature of the shell portion is higher than a temperature of the flange portion, deformation occurs such that a central portion of an end wall of the outer vehicle cabin 2 is recessed in the axial direction, and the protrusion portion 6 protruding from the outer vehicle cabin 2 in the axial direction unevenly comes into contact with the vehicle cabin support table 8 and the vehicle cabin upper-half portion 3 is lifted (that is, the outer vehicle cabin 2 is displaced upward). The second term is a term representing such a displacement of the outer vehicle cabin 2.

It is desirable that a temperature measurement position of the shell portion and a temperature measurement position of the flange portion, which are used for the calculation of $I_2$, are close to each other in the axial direction. It is desirable that the temperature measurement position of the shell portion and the temperature measurement position of the flange portion used for the calculation of $I_2$ are positions where the temperature difference between the shell portion and the flange portion is relatively large (for example, positions close to the steam inlet portions 28 and 29 in the axial direction).

$I_2$ may be, for example, a difference between $T_{C1}$ and $T_{C2}$ ($T_{C1}-T_{C2}$), a difference between $T_{C3}$ and $T_{C2}$ ($T_{C3}-T_{C2}$), a difference between an average of $T_{C1}$ and $T_{C3}$ and $T_{C2}$ ($(T_{C1}+T_{C3})/2-T_{C2}$), a difference between $T_{E1}$ and $T_{E2}$ ($T_{E1}-T_{E2}$), a difference between $T_{E3}$ and $T_{E2}$ ($T_{E3}-T_{E2}$), or a difference between an average of $T_{E1}$ and $T_{E3}$ and $T_{E2}$ ($(T_{E1}+T_{E3})/2-T_{E2}$), or may be a linear combination of two or more of these (for example, $k_e \times [(T_{C1}+T_{C3})/2-T_{C2}]+k_e \times [(T_{E1}+T_{E3})/2-T_{E2}]$, where $k_c k_e$ is a coefficient).

$I_3$ included in the third term of the above equation (A) is a value representing a temperature difference between the upper flange 3*b* and the lower flange 4*b* of the outer vehicle cabin 2. If the upward displacement of the outer vehicle cabin 2 is set to be positive, the coefficient $k_3$ of the third term is a positive value. When the temperature of the upper flange 3*b* is higher than the temperature of the lower flange 4*b*, the outer vehicle cabin 2 is deformed such that the central portion of the outer vehicle cabin 2 in the axial direction is lifted, and the outer vehicle cabin 2 is displaced upward. The third term is a term representing such a displacement of the outer vehicle cabin 2.

It is desirable that a temperature measurement position of the upper flange 3*b* and a temperature measurement position of the lower flange 4*b*, which are used for the calculation of $I_3$, are close to each other in the axial direction. $I_3$ may be, for example, a difference between $T_{D1}$ and $T_{D2}$ ($T_{D1}-T_{D2}$), a difference between $T_{D1}$ and $T_{C2}$ ($T_{D1}-T_{C2}$), or a difference between $T_{E2}$ and $T_{D2}$ ($T_{E2}-T_{D2}$), or may be a linear combination of two or more of these.

$I_4$ included in the fourth term of the above equation (A) is a value indicating the thermal elongation amount in an up-down direction of the vehicle cabin support table 8 on which the protrusion portion 6 of the outer vehicle cabin 2 is placed. If the upward displacement of the outer vehicle cabin 2 is set to be positive, the coefficient $k_4$ of the fourth term is a positive value. If the thermal elongation amount of the vehicle cabin support table 8 increases, the outer vehicle cabin 2 is lifted upward and displaced upward. The fourth term is a term representing such a displacement of the outer vehicle cabin 2.

$I_4$ indicating the thermal elongation amount of the vehicle cabin support table 8 may be acquired based on a temperature Ts of the vehicle cabin support table 8 measured by the temperature sensor 32. $I_4$ may be calculated from, for example, the following equation (B).

$$I_4 = (Ts - a) \times b \tag{B}$$

In the above equation (B), a and b are coefficients, respectively.

$I_5$ included in the fifth term of the above equation (A) is a value indicating a displacement of the rotor 12 (rotating part) of the steam turbine 1 in an up-down direction. If the upward displacements of the outer vehicle cabin 2 and the rotor 12 are set to be positive, the coefficient $k_5$ of the fifth term is a negative value. During an operation of the steam turbine 1 (rotating machine), the rotor 12 may be displaced upward in a case where the bearing pedestal 26 supporting a bearing supporting the rotor 12 is thermally elongated in an up-down direction or the rotation speed of the rotor 12 is increased. The fifth term is a term representing such a displacement of the rotor 12. By including the fifth term indicating the displacement of the rotor 12, the index CCI indicating a relative displacement of the outer vehicle cabin 2 with respect to the rotor 12 can be obtained.

$I_5$ indicating the displacement of the rotor 12 may be acquired based on a temperature Tb of the bearing pedestal 26 measured by the temperature sensor 34 and/or a rotation speed R of the rotor 12 measured by the rotation speed sensor 36. $I_5$ may be calculated from, for example, the following equation (C).

$$I_5 = d \times Tb + e \times R \tag{C}$$

In the above equation (C), d and e are coefficients, respectively.

$I_6$ included in the sixth term of the above equation (A) is a value indicating an output of the steam turbine 1 (rotating machine). If the upward displacement of the outer vehicle cabin 2 is set to be positive, the coefficient $k_6$ of the sixth term is a positive value. If a thrust force acts on the protrusion portion 6 of the outer vehicle cabin 2 as the output of the rotating machine increases, in a case where a position of the protrusion portion 6 in an axial direction is restricted, or the like, the protrusion portion 6 may be bent and the outer vehicle cabin 2 may be deformed to be lifted upward. The sixth term is a term representing such a displacement of the outer vehicle cabin 2.

In a case of the steam turbine 1, $I_6$ indicating the output can be calculated based on, for example, a temperature or a flow rate of a gas supplied to a boiler for generating steam supplied to the steam turbine 1.

The constant term $C_A$ of the above equation (A) is a value indicating a position adjustment amount by means of an adjustment member for adjusting a relative position of the outer vehicle cabin 2 with respect to the rotor 12 in the up-down direction, and is, for example, a height of the adjustment member (shim or the like).

The above equation (A) also includes a linear combination of sums of the plurality of n-th terms as represented by the following equation (D).

$$CCI = (m_1 \times I_1 + m_2 \times I_2 + m_3 \times I_3) \times M_1 + (m_4 \times I_4 + m_5 \times I_5) \times M_2 + C_A \tag{D}$$

The coefficients ($k_1$ to $k_6$, a to e, $m_1$ to $m_5$, $M_1$, $M_2$, and the like) described above used for calculating the index CCI can be obtained in advance from an operation record of the rotating machine depending on a type or an individual unit of the rotating machine.

The index CCI indicating the displacement of the outer vehicle cabin 2 in the up-down direction may be a sum of two or more of the first term to the sixth term included in the above equation (A).

For example, the index CCI may be represented by a sum of the first term and the second term included in the above equation (A) (the following equation (A')).

$$CCI = k_1' \times I_1 + k_2' \times I_2 \tag{A'}$$

The coefficients $k_1$ and $k_2$ included in the above equation (A) and the coefficients $k_1'$ and $k_2'$ included in the above equation (A') may be different from each other.

Alternatively, the index CCI may be obtained by adding one or more of the third term to the sixth term and the constant term to the sum of the first term and the second term included in the above equation (A).

As described above, the index CCI indicating the displacement of the outer vehicle cabin 2 in the up-down direction can be calculated by using the temperatures at the plurality of positions of the outer vehicle cabin 2. The index CCI calculated in this way can be used as an index indicating the clearance between the rotating part and the stationary part of the rotating machine.

Next, the control unit 56 compares the index CCI calculated in step S4 with a specified range set in advance (S6, S10).

The fact that the index CCI is smaller than the specified range means that an amount of upward displacement of the outer vehicle cabin 2 is smaller than a reference and that a clearance at an uppermost portion of the rotor 12 is smaller than a reference. Therefore, in a case where the index CCI is smaller than the specified range (Yes in step S6), the control unit 56 adjusts the shape or the position of the outer vehicle cabin 2 such that the index CCI is within the specified range (S8). In step S8, the control unit 56 may change the position of the outer vehicle cabin 2 such that the thermal elongation amount of the vehicle cabin support table 8 is adjusted and the outer vehicle cabin 2 is lifted by, for example, appropriately controlling the heating unit 62 (temperature adjustment unit 60) to heat the vehicle cabin support table 8.

On the other hand, the fact that the index CCI is larger than the specified range means that the amount of upward displacement of the outer vehicle cabin 2 is larger than a reference and that a clearance at a lowermost portion of the rotor 12 is smaller than a reference. Therefore, in a case where the index CCI is larger than the specified range (Yes in step S10), the control unit 56 adjusts the shape or the position of the outer vehicle cabin 2 such that the index CCI is within the specified range (S12). In step S12, the control unit 56 may appropriately control, for example, the cooling unit 64 (temperature adjustment unit 60) to supply the cooling fluid to the protrusion portion 6 to deform the outer vehicle cabin 2 to be sunk.

In this way, when the index CCI calculated in step S4 is out of the specified range, the shape or the position of the outer vehicle cabin 2 is adjusted such that the index CCI is within the specified range. In this manner, it is possible to prevent the clearance at an uppermost portion or a lowermost portion of the rotating part of the steam turbine 1 (rotating machine) from being too small. Therefore, it is possible to effectively suppress contact between the rotating part and the stationary part of the steam turbine 1 (rotating machine).

For example, the contents described in each embodiment are understood as follows.

(1) A monitoring and control device (50) for a rotating machine according to at least one embodiment of the present invention is a monitoring and control device for monitoring or controlling a clearance of a rotating machine (for example, the steam turbine 1 described above) including a vehicle cabin (for example, the outer vehicle cabin 2 described above) that accommodates a rotating part and a stationary part, the monitoring and control device including an acquisition unit (52) configured to acquire a plurality of temperatures at a plurality of positions of the vehicle cabin, and an index calculation unit (54) configured to calculate an index (for example, the index CCI described above) indicating a displacement of the vehicle cabin in an up-down direction based on the plurality of temperatures.

According to a configuration of (1) above, it is possible to calculate the index indicating the displacement of the vehicle cabin in the up-down direction, based on the plurality of temperatures at the plurality of positions in the vehicle cabin. Therefore, the clearance between the rotating part and the stationary part can be more appropriately monitored or controlled based on the index calculated in this way. In addition, a temperature of the vehicle cabin can be acquired by a simple configuration in which the temperature sensor is provided in the vehicle cabin. Therefore, in the configuration of (1) above, the index indicating the displacement of the vehicle cabin in the up-down direction can be calculated with a simple configuration, and the clearance can be appropriately monitored or controlled based on the calculated index.

(2) In some embodiments, in the configuration of (1) above, the index includes a linear combination of the plurality of temperatures.

According to a configuration of (2) above, it is possible to obtain the index indicating the displacement of the vehicle cabin in the up-down direction with a relatively simple calculation using the linear combination of the plurality of temperatures at the plurality of positions in the vehicle cabin. Therefore, an appropriate monitoring or control of the clearance can be performed with a simple configuration.

(3) In some embodiments, in the configuration of (1) or (2) above, the vehicle cabin includes an upper-half portion (for example, the vehicle cabin upper-half portion 3 described above) having an upper shell (3*a*) and a lower-half portion (for example, the vehicle cabin lower-half portion 4 described above) having a lower shell (4*a*), the acquisition unit is configured to acquire a temperature of the upper shell and a temperature of the lower shell, and the index calculation unit is configured to calculate the index including a first term related to a temperature difference between the upper shell and the lower shell.

According to a configuration of (3) above, since the index including the first term related to the temperature difference between the upper shell and the lower shell is calculated, it is possible to obtain an index in which an up-and-down movement of the vehicle cabin caused by the temperature difference between the upper shell and the lower shell is taken into consideration. Therefore, the clearance between the rotating part and the stationary part can be more appropriately monitored or controlled based on the index.

(4) In some embodiments, in the configuration of any one of (1) to (3) above, the vehicle cabin includes an upper-half portion having an upper flange (3*b*) and an upper shell (3*a*), and a lower-half portion having a lower flange (4*b*) fastened to the upper flange and a lower shell (4*a*), the acquisition unit is configured to acquire a temperature of a shell portion including the upper shell or the lower shell and a temperature of a flange portion including the upper flange or the lower flange, and the index calculation unit is configured to calculate the index including a second term related to a temperature difference between the shell portion and the flange portion.

According to a configuration of (4) above, since the index including the second term related to the temperature difference between the shell portion and the flange portion is calculated, it is possible to obtain an index in which an up-and-down movement of the vehicle cabin caused by the temperature difference between the shell portion and the flange portion is taken into consideration. Therefore, the clearance between the rotating part and the stationary part can be more appropriately monitored or controlled based on the index.

(5) In some embodiments, in the configuration of any one of (1) to (4) above, the vehicle cabin includes an upper-half portion having an upper flange, and a lower-half portion having a lower flange fastened to the upper flange, the acquisition unit is configured to acquire a temperature of the upper flange and a temperature of the lower flange, and the index calculation unit is configured to calculate the index including a third term related to a temperature difference between the upper flange and the lower flange.

According to a configuration of (5) above, since the index including the third term related to the temperature difference between the upper flange and the lower flange is calculated, it is possible to obtain an index in which an up-and-down movement of the vehicle cabin caused by the temperature difference between the upper flange and the lower flange is taken into consideration. Therefore, the clearance between the rotating part and the stationary part can be more appropriately monitored or controlled based on the index.

(6) In some embodiments, in the configuration of any one of (1) to (5) above, the vehicle cabin has a protrusion portion (6) protruding in an axial direction, and the index calculation unit is configured to calculate the index including a fourth term related to a thermal elongation amount of a vehicle cabin support table (8) on which the protrusion portion is placed.

According to a configuration of (6) above, since the index including the fourth term related to the thermal elongation amount of the vehicle cabin support table on which the protrusion portion of the vehicle cabin is placed is calculated, it is possible to obtain an index in which an up-and-down movement of the vehicle cabin caused by the thermal elongation of the vehicle cabin support table is taken into consideration. Therefore, the clearance between the rotating part and the stationary part can be more appropriately monitored or controlled based on the index.

(7) In some embodiments, in the configuration of any one of (1) to (6) above, the index calculation unit is configured to calculate the index including a fifth term related to a displacement of the rotating part of the rotating machine in an up-down direction.

According to a configuration of (7) above, since the index including the fifth term related to the displacement of the rotating part in the up-down direction is calculated, it is possible to obtain an index in which the displacement of the rotating part in the up-down direction is taken into consideration. Therefore, the clearance between the rotating part and the stationary part can be more appropriately monitored or controlled based on the index.

(8) In some embodiments, in the configuration of any one of (1) to (7) above, the index calculation unit is configured to calculate the index including a sixth term related to an output of the rotating machine.

According to a configuration of (8) above, since the index including the sixth term related to the output of the rotating machine is calculated, it is possible to obtain an index in which an up-and-down movement of the vehicle cabin caused by a change in the output of the rotating machine is taken into consideration. Therefore, the clearance between the rotating part and the stationary part can be more appropriately monitored or controlled based on the index.

(9) In some embodiments, in the configuration of any one of (1) to (8) above, the monitoring and control device for a rotating machine includes a control unit (56) configured to adjust a shape or a position of the vehicle cabin based on the index calculated by the index calculation unit.

According to a configuration of (9) above, the shape or the position of the vehicle cabin can be changed by the control unit based on the index indicating the displacement of the vehicle cabin in the up-down direction. Therefore, it is possible to effectively suppress contact between the rotating part and the stationary part of the rotating machine.

(10) In some embodiments, in the configuration of (9) above, the control unit is configured to adjust the shape or the position of the vehicle cabin such that the index calculated by the index calculation unit is within a specified range when the index is out of the specified range.

According to a configuration of (10) above, when the calculated index is out of the specified range, the shape or the position of the vehicle cabin is adjusted such that the index is within the specified range. Therefore, it is possible to prevent the clearance at the uppermost portion or the lowermost portion of the rotating part from being too small, and thus, it is possible to effectively suppress contact between the rotating part and the stationary part of the rotating machine.

(11) In some embodiments, in the configuration of (9) or (10) above, the control unit is configured to control a temperature adjustment unit (60) for heating or cooling at least a part of the vehicle cabin or a vehicle cabin support portion supporting the vehicle cabin such that the index is within a specified range.

According to a configuration of (11) above, when the calculated index is out of the specified range, the temperature adjustment unit is controlled, and at least a part of the vehicle cabin or the vehicle cabin support portion is heated or cooled such that the index is within the specified range. Therefore, it is possible to prevent the clearance at the uppermost portion or the lowermost portion of the rotating part from being too small, and thus, it is possible to effectively suppress contact between the rotating part and the stationary part of the rotating machine.

(12) Rotating machine equipment (100) according to at least one embodiment of the present invention includes a rotating machine (for example, the steam turbine 1 described above) including a vehicle cabin that accommodates a rotating part and a stationary part, and the monitoring and control device (50) according to any one of (1) to (11) above for monitoring or controlling a clearance of the rotating machine.

According to a configuration of (12) above, it is possible to calculate the index indicating the displacement of the vehicle cabin in the up-down direction, based on the plurality of temperatures at the plurality of positions in the vehicle cabin. Therefore, the clearance between the rotating part and the stationary part can be more appropriately monitored or controlled based on the index calculated in this way. In addition, a temperature of the vehicle cabin can be acquired by a simple configuration in which the temperature sensor is provided in the vehicle cabin. Therefore, in the configuration of (12) above, the index indicating the displacement of the vehicle cabin in the up-down direction can be calculated with a simple configuration, and the clearance can be appropriately monitored or controlled based on the calculated index.

(13) A monitoring and control method for a rotating machine according to at least one embodiment of the present invention is a monitoring and control method for monitoring or controlling a clearance of a rotating machine (for example, the steam turbine 1 described above) including a vehicle cabin (for example, the outer vehicle cabin 2 described above) that accommodates a rotating part and a stationary part, the monitoring and control method including a step (S2) of acquiring a plurality of temperatures at a plurality of positions of the vehicle cabin, and a step (S4) of calculating an index indicating a displacement of the vehicle cabin in an up-down direction based on the plurality of temperatures.

According to the method of (13) above, it is possible to calculate the index indicating the displacement of the vehicle cabin in the up-down direction, based on the plurality of temperatures at the plurality of positions in the vehicle cabin. Therefore, the clearance between the rotating part and the stationary part can be more appropriately monitored or controlled based on the index calculated in this way. In addition, a temperature of the vehicle cabin can be acquired by a simple configuration in which the temperature sensor is provided in the vehicle cabin. Therefore, in the method of (13) above, the index indicating the displacement of the vehicle cabin in the up-down direction can be calculated with a simple configuration, and the clearance can be appropriately monitored or controlled based on the calculated index.

(14) A monitoring and control program for a rotating machine according to at least one embodiment of the present invention is a monitoring and control program for monitoring or controlling a clearance of a rotating machine (for example, the steam turbine 1 described above) including a vehicle cabin (for example, the outer vehicle cabin 2 described above) that accommodates a rotating part and a stationary part, the monitoring and control program being configured to cause a computer (for example, the monitoring and control device 50 described above) to execute a procedure of acquiring a plurality of temperatures at a plurality of positions of the vehicle cabin, and a procedure of calculating an index indicating a displacement of the vehicle cabin in an up-down direction based on the plurality of temperatures.

According to the program of (14) above, it is possible to calculate the index indicating the displacement of the vehicle cabin in the up-down direction, based on the plurality of temperatures at the plurality of positions in the vehicle cabin. Therefore, the clearance between the rotating part and the stationary part can be more appropriately monitored or controlled based on the index calculated in this way. In addition, a temperature of the vehicle cabin can be acquired by a simple configuration in which the temperature sensor is provided in the vehicle cabin. Therefore, in the program of (14) above, the index indicating the displacement of the vehicle cabin in the up-down direction can be calculated with a simple configuration, and the clearance can be appropriately monitored or controlled based on the calculated index.

Although the embodiments of the present invention have been described, the present invention is not limited to the above-described embodiments, and includes modifications of the above-described embodiments and a combination of these embodiments as appropriate.

In the present specification, an expression representing a relative or absolute arrangement such as "in a certain direction", "along a certain direction", "parallel", "orthogonal", "center", "concentric", or "coaxial" does not strictly represent only such an arrangement, but also a tolerance or a state of being relatively displaced with an angle or a distance to the extent that the same function can be obtained.

For example, expressions such as "identical", "equal", and "homogeneous" indicating that things are in an equal state do not strictly represent only the equal state, but also a tolerance or a state where there is a difference to the extent that the same function can be obtained.

In addition, in the present specification, an expression representing a shape such as a quadrangular shape or a cylindrical shape does not represent only a shape such as a quadrangular shape or a cylindrical shape in a geometrically strict sense, but also a shape including an uneven portion, a chamfered portion, and the like within a range in which the same effect can be obtained.

In addition, in the present specification, expressions such as "comprising", "including", or "having" one component are not exclusive expressions excluding the presence of other components.

REFERENCE SIGNS LIST

1: steam turbine
2: outer vehicle cabin
3: vehicle cabin upper-half portion
3*a*: upper shell
3*b*: upper flange
4: vehicle cabin lower-half portion
4*a*: lower shell
4*b*: lower flange
6: protrusion portion
8: vehicle cabin support table
10: foundation
12: rotor
14: rotor blade
16: inner vehicle cabin
18: blade ring
19: stator blade
20: dummy ring
22: seal portion
26: bearing pedestal
28: steam inlet portion
29: steam inlet portion
30 (30A-1 to 30F-2): temperature sensor
32, 32*a*, 32*b*: temperature sensor
34, 34*a*, 34*b*: temperature sensor
36: rotation speed sensor
50: monitoring and control device
52: acquisition unit
54: index calculation unit
56: control unit
60: temperature adjustment unit
62: heating unit
64: cooling unit
100: rotating machine equipment
O: central axis

The invention claimed is:

1. A monitoring and control device for a rotating machine, the monitoring and control device being for monitoring or controlling a clearance of a rotating machine including a vehicle cabin that accommodates a rotating part and a stationary part, the monitoring and control device comprising:

an acquisition unit including a processor and configured to acquire a plurality of temperatures at a plurality of positions of the vehicle cabin; and an index calculation unit including a processor and configured to calculate an index indicating a displacement of the vehicle cabin in an up-down direction based on the plurality of temperatures;

wherein the vehicle cabin includes an upper-half portion having an upper flange and an upper shell, and a lower-half portion having a lower flange fastened to the upper flange and a lower shell, and wherein the index calculation unit is configured to calculate the index including a linear combination of at least two of a first term related to a temperature difference between the upper shell and the lower shell, a second term related to a temperature difference between a shell portion including the upper shell or the lower shell and a flange portion including the upper flange or the lower flange, a third term related to a temperature difference between the upper flange and the lower flange, a fourth term related to a thermal elongation amount of a vehicle cabin support table on which a protrusion portion protruding in an axial direction is placed, a fifth term related to a displacement of the rotating part of the rotating machine in an up-down direction, and a sixth term related to an output of the rotating machine.

2. The monitoring and control device for a rotating machine according to claim 1, wherein the acquisition unit is configured to acquire a temperature of the upper shell and a temperature of the lower shell, and the index calculation unit is configured to calculate the index including the first term related to a temperature difference between the upper shell and the lower shell.

3. The monitoring and control device for a rotating machine according to claim 1, wherein the acquisition unit is configured to acquire a temperature of the shell portion including the upper shell or the lower shell and a temperature of the flange portion including the upper flange or the lower flange, and the index calculation unit is configured to calculate the index including the second term related to a temperature difference between the shell portion and the flange portion.

4. The monitoring and control device for a rotating machine according to claim 1, wherein the acquisition unit is configured to acquire a temperature of the upper flange and a temperature of the lower flange, and the index calculation unit is configured to calculate the index including the third term related to a temperature difference between the upper flange and the lower flange.

5. The monitoring and control device for a rotating machine according to claim 1, wherein the index calculation unit is configured to calculate the index including the fourth term related to a thermal elongation amount of a vehicle cabin support table on which the protrusion portion is placed.

6. The monitoring and control device for a rotating machine according to claim 1, wherein the index calculation unit is configured to calculate, based on a temperature of a bearing pedestal accommodating a bearing of the rotating part and a rotation speed of the rotating part, the index including the fifth term related to a displacement of the rotating part of the rotating machine in an up-down direction.

7. The monitoring and control device for a rotating machine according to claim 1, wherein the index calculation unit is configured to calculate the index including a sixth term related to an output of the rotating machine.

8. The monitoring and control device for a rotating machine according to claim 1, further comprising:

a control unit including a processor and configured to adjust a shape or a position of the vehicle cabin based on the index calculated by the index calculation unit.

9. The monitoring and control device for a rotating machine according to claim 8, wherein the control unit is configured to adjust the shape or the position of the vehicle cabin such that the index calculated by the index calculation unit is within a specified range when the index is out of the specified range.

10. The monitoring and control device for a rotating machine according to claim 8, wherein the control unit is configured to control a temperature adjustment unit for heating or cooling at least a part of the vehicle cabin or a vehicle cabin support portion supporting the vehicle cabin such that the index is within a specified range.

11. Rotating machine equipment comprising:

a rotating machine including a vehicle cabin that accommodates a rotating part and a stationary part; and the monitoring and control device according to claim 1 for monitoring or controlling a clearance of the rotating machine.

12. A monitoring and control method for a rotating machine, the monitoring and control method being for monitoring or controlling a clearance of a rotating machine including a vehicle cabin that accommodates a rotating part and a stationary part, the monitoring and control method comprising:

a step of acquiring a plurality of temperatures at a plurality of positions of the vehicle cabin; and a step of calculating an index indicating a displacement of the vehicle cabin in an up-down direction based on the plurality of temperatures, wherein the vehicle cabin includes an upper-half portion having an upper flange and an upper shell, and a lower-half portion having a lower flange fastened to the upper flange and a lower shell, and wherein the step of calculating the index comprises calculating the index including a linear combination of at least two of a first term related to a temperature difference between the upper shell and the lower shell, a second term related to a temperature difference between a shell portion including the upper shell or the lower shell and a flange portion including the upper flange or the lower flange, a third term related to a temperature difference between the upper flange and the lower flange, a fourth term related to a thermal elongation amount of a vehicle cabin support table on which a protrusion portion protruding in an axial direction is placed, a fifth term related to a displacement of the rotating part of the rotating machine in an up-down direction, and a sixth term related to an output of the rotating machine.

13. A monitoring and control program for a rotating machine, the monitoring and control program being for monitoring or controlling a clearance of a rotating machine including a vehicle cabin that accommodates a rotating part and a stationary part, the monitoring and control program causing a computer including a processor to execute:

a procedure of acquiring a plurality of temperatures at a plurality of positions of the vehicle cabin; and a procedure of calculating an index indicating a displacement of the vehicle cabin in an up-down direction based on the plurality of temperatures, wherein the vehicle cabin includes an upper-half portion having an upper flange and an upper shell, and a lower-half portion having a lower flange fastened to the upper flange and a lower shell, and wherein the procedure of calculating the index comprises calculating the index including a linear combination of at least two of a first term related to a temperature difference between the upper shell and the lower shell, a second term related to a temperature difference between a shell portion including the upper shell or the lower shell and a flange portion including the upper flange or the lower flange, a third term related to a temperature difference between the upper flange and the lower flange, a fourth term related to a thermal elongation amount of a vehicle cabin support table on which a protrusion portion protruding in an axial direction is placed, a fifth term related to a displacement of the rotating part of the rotating machine in an up-down direction, and a sixth term related to an output of the rotating machine.

* * * * *